United States Patent
Park et al.

(10) Patent No.: US 9,788,003 B2
(45) Date of Patent: *Oct. 10, 2017

(54) METHOD AND APPARATUS FOR MULTIPLEXING AND DEMULTIPLEXING VIDEO DATA TO IDENTIFY REPRODUCING STATE OF VIDEO DATA

(75) Inventors: Young-o Park, Seoul (KR);
Kwang-pyo Choi, Anyang-si (KR);
Chan-yul Kim, Seongnam-si (KR);
Hee-chul Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 376 days.

This patent is subject to a terminal disclaimer.

(21) Appl. No.: 14/130,600

(22) PCT Filed: Jul. 2, 2012

(86) PCT No.: PCT/KR2012/005256
§ 371 (c)(1),
(2), (4) Date: Jan. 2, 2014

(87) PCT Pub. No.: WO2013/005969
PCT Pub. Date: Jan. 10, 2013

(65) Prior Publication Data
US 2014/0146885 A1 May 29, 2014

Related U.S. Application Data

(60) Provisional application No. 61/552,549, filed on Oct. 28, 2011, provisional application No. 61/504,178, filed on Jul. 2, 2011.

(51) Int. Cl.
*H04N 19/70* (2014.01)
*H04N 19/46* (2014.01)
(Continued)

(52) U.S. Cl.
CPC .......... *H04N 19/46* (2014.11); *H04N 19/107* (2014.11); *H04N 19/119* (2014.11);
(Continued)

(58) Field of Classification Search
CPC .... H04N 19/70; H04N 19/119; H04N 19/188; H04N 21/2387; H04N 21/6587
See application file for complete search history.

(56) References Cited

U.S. PATENT DOCUMENTS 7,552,227 B2   6/2009 Wang
8,254,446 B2   8/2012 Toma et al.
(Continued)

FOREIGN PATENT DOCUMENTS

CA   2 439 048 A1   6/2003
CN   101222616 A   7/2008
(Continued)

OTHER PUBLICATIONS

ITU-T H.264 Advanced video coding for generic audiovisual services, May 2003.*
(Continued)

*Primary Examiner* — Robert Hance
(74) *Attorney, Agent, or Firm* — Sughrue Mion, PLLC

(57) ABSTRACT

A method and apparatus for multiplexing and de-multiplexing video data. The method of multiplexing the video data involves syntax to a header of transmission unit data that is used to multiplex a clean random access (CRA) picture used in a random access, wherein the predetermined syntax indicates a reproduction status of the CRA picture, i.e., normal reproduction or reproduction according to a random access.

3 Claims, 18 Drawing Sheets

(51) Int. Cl.

| | | |
|---|---|---|
| *H04N 19/119* | (2014.01) | |
| *H04N 21/426* | (2011.01) | |
| *H04N 21/845* | (2011.01) | |
| *H04N 21/2387* | (2011.01) | |
| *H04N 21/6587* | (2011.01) | |
| *H04N 19/107* | (2014.01) | |
| *H04N 19/503* | (2014.01) | |
| *H04N 19/169* | (2014.01) | |
| *H04N 19/426* | (2014.01) | |

(52) U.S. Cl.
CPC ......... *H04N 19/188* (2014.11); *H04N 19/426* (2014.11); *H04N 19/503* (2014.11); *H04N 19/70* (2014.11); *H04N 21/2387* (2013.01); *H04N 21/42623* (2013.01); *H04N 21/6587* (2013.01); *H04N 21/8455* (2013.01)

(56) References Cited

U.S. PATENT DOCUMENTS

| | | |
|---|---|---|
| 8,260,124 B2 | 9/2012 | Kim et al. |
| 8,300,690 B2 | 10/2012 | Hannuksela |
| 8,345,743 B2 | 1/2013 | Shi et al. |
| 9,113,171 B2 | 8/2015 | Boon et al. |
| 2002/0064371 A1* | 5/2002 | Seo ................... G11B 27/034 386/334 |
| 2003/0007781 A1 | 1/2003 | Boon |
| 2003/0156640 A1 | 8/2003 | Sullivan |
| 2004/0066854 A1 | 4/2004 | Hannuksela |
| 2005/0123274 A1 | 6/2005 | Crinon et al. |
| 2005/0169371 A1 | 8/2005 | Lee et al. |
| 2006/0262862 A1 | 11/2006 | Cheng et al. |
| 2007/0172138 A1 | 7/2007 | Hasegawa et al. |
| 2008/0075168 A1 | 3/2008 | Toma et al. |
| 2008/0117988 A1* | 5/2008 | Toma ................... G11B 27/005 375/240.26 |
| 2008/0159407 A1 | 7/2008 | Yang et al. |
| 2008/0170528 A1* | 7/2008 | Bosch ................ H04N 21/2221 370/312 |
| 2008/0170564 A1 | 7/2008 | Shi et al. |
| 2008/0193107 A1 | 8/2008 | Kim et al. |
| 2008/0275905 A1* | 11/2008 | Hannuksela ...... G06F 17/30017 |
| 2009/0175334 A1 | 7/2009 | Ye et al. |
| 2010/0008420 A1 | 1/2010 | Lin |
| 2011/0243225 A1* | 10/2011 | Min ....................... H04N 19/44 375/240.12 |
| 2012/0230433 A1 | 9/2012 | Chen et al. |
| 2013/0060956 A1 | 3/2013 | Nagaraj et al. |
| 2013/0064284 A1 | 3/2013 | Samuelsson et al. |
| 2013/0114705 A1* | 5/2013 | Chen ................ H04N 19/00569 375/240.12 |
| 2013/0294500 A1 | 11/2013 | Wang |
| 2014/0003536 A1 | 1/2014 | Wang et al. |

FOREIGN PATENT DOCUMENTS

| | | |
|---|---|---|
| CN | 101232615 A | 7/2008 |
| JP | 2003-319340 A | 11/2003 |
| JP | 2009-105970 A | 5/2009 |
| JP | 2011-19270 A | 1/2011 |
| JP | 2014-513456 A | 5/2014 |
| JP | 2014-526180 A | 10/2014 |
| JP | 2014-529258 A | 10/2014 |
| KR | 10-0446365 B1 | 9/2004 |
| KR | 10-2008-0076079 A | 8/2008 |
| KR | 10-2009-0089409 A | 8/2009 |
| RU | 2419245 C2 | 12/2010 |
| RU | 2009122491 A | 12/2010 |
| TW | I264951 B | 10/2006 |
| TW | 200708109 A | 2/2007 |
| TW | 200950529 A | 12/2009 |
| TW | 201352005 A | 12/2013 |
| TW | 201412126 A | 3/2014 |
| WO | 2008/061164 A2 | 5/2008 |
| WO | 2008067761 A1 | 6/2008 |
| WO | 2011/115045 A1 | 9/2011 |
| WO | 2012/122480 A1 | 9/2012 |
| WO | 2013/012372 A1 | 1/2013 |

OTHER PUBLICATIONS

Communication dated Sep. 3, 2015 issued by the Korean Intellectual Property Office in counterpart Korean Patent Application No. 10-2014-0148737.
Communication dated Sep. 29, 2015 issued by the Japanese Patent Office in counterpart Japanese Patent Application No. 2014-518821.
Akira Fujibayashi et al; "Random access support for HEVC"; Joint Collaborative Team on Video Coding (JCT-VC) of ITU-T SG16 WP3 and ISO/IEC JTC1/SC29/WG11; Jan. 20-28, Document: JCTVC-D234; 2011 9 pgs. total.
Ye-Kui Wang et al.; "On CDR picture"; Joint Collaborative Team on Video Coding (JCT-VC) of ITU-T SG16 WP3 and ISO/IEC JTC1/SC29/WG11, 6th Meeting: Torino, Jul. 14-22, 2011; Document: JCTVC-F464; 4 pgs. total.
Youngo Park et al.; "Detection of a CDR for random access"; Joint Collaborative Team on Video Coding (JCT-VC) of ITU-T SG16 WP3 and ISO/IEC JTC1/SC29/WG11, 6th Meeting: Torino; Jul. 14-22, 2011; Document: JCTVC-F604; 5 pgs. total.
Youngo Park et al.; "On syntax for clean random access (CRA) pictures"; Joint Collaborative Team on Video Coding (JCT-VC) of ITU-T SG16 WP3 and ISO/IEC JTC1/SC29/WG11, 7th Meeting: Geneva; Nov. 21-30, 2011; Document: JCTVC-G533; 7 pgs. total.
Tan, "Clean decoding refresh definition and decoding process", Joint Collaborative Team on Video Coding (JCT-VC) of ITU-T SG16 WP3 and ISO/IEC JTC1/SC29/WG11, 6th Meeting, Jul. 14-22, 2011, JCTV-F381, URL: http://phenix.it-sudparis.eu/jct/doc_end_user_documents/6_Torino/wg11/JCTVC-F381-v1.zip, 4 pages.
Communication, Issued by the Japan Patent Office, Dated Dec. 24, 2014, in counterpart Japanese Application No. 2014-518821.
Park et al., "On syntax for clean random access (CRA) pictures", Joint Collaborative Team on Video Coding (JCT-VC) of ITU-T SG16 WP3 and ISO/IEC JTC1/SC29/WG11, 7th Meeting, Nov. 21-30, 2011, JCTVC-G533, URL: http://wftp3.itu.int/av-arch/jctvc-site, 2 pages.
Park et al., "Detection of a CDR for random access", Joint Collaborative Team on Video Coding (JCT-VC) of ITU-T SG16 WP3 and ISO/IEC JTC1/SC29/WG11, 6th Meeting, Jul. 14-22, 2011, JCTVC-F604, http://wftp3.itu.int/av-arch/jctvc-site/, 3 pages.
Communication, Issued by the European Patent Office, Dated Mar. 2, 2015, In counterpart European Application No. 12806944.0.
Notice of Allowance from the Korean Patent Office issued Jul. 29, 2014 in a counterpart Korean Application No. 10-2012-0071986.
Office Action from the Korean Patent Office issued Apr. 21, 2014 in a counterpart Korean Application No. 10-2012-0071986.
Communication from the Korean Patent Office issued Jun. 19, 2015 in a counterpart Korean Application No. 10-2014-0059297.
International Search Report issued Dec. 14, 2012 in International Application No. PCT/KR2012/005256 (PCT/ISA/210).
Written Opinion issued Dec. 14, 2012 in International Application No. PCT/KR2012/005256 (PCT/ISA/237).
Chen, et al., "Comments on Clean Decoding Refresh Pictures", Joint Collaborative Team on Video Coding (JCT-VC), of ITU-T SG16 WP3 and ISO/IEC JTC1/SC29/WG11, Document: JCTVC-E400, Mar. 16-23, 2011, pp. 1-4.
Communication issued Mar. 7, 2016, issued by the Taiwanese Intellectual Property Office in counterpart Taiwanese Patent Application No. 101123830.
Communication issued Mar. 30, 2016, issued by the Federal Service for Intellectual Property in counterpart Russian Patent Application No. 2014103489.
Wiegand, et al., "WD3: Working Draft 3 of High Efficiency Video Coding", Joint Collaborative Team on Video Coding (JCT-VC) of ITU-T SG16 WP3 and ISO/IEC JTC1/SC29/WG11, 5th Meeting, Mar. 16, 2011-Mar. 23, 2011, 167 pages total, Geneva, Switzerland.

(56) References Cited

OTHER PUBLICATIONS

Communication issued Dec. 15, 2015, issued by the Korean Intellectual Property Office in counterpart Korean Patent Application No. 10-2014-0059297.
Communication issued Dec. 31, 2015, issued by the Taiwan Intellectual Property Office in counterpart Taiwanese Patent Application No. 104122835.
Communication dated Jun. 2, 2016 issued by The State Intellectual Property Office of P.R. China in counterpart Chinese Application No. 201280042854.5.
Communication dated Aug. 15, 2016 issued by Canadian Patent Office in counterpart Canadian Application No. 2,840,893.
Communication dated Sep. 5, 2016 issued by Taiwanese Intellectual Property Office in counterpart Taiwan Patent Application No. 105110841.
Communication dated Nov. 8, 2016, issued by the Japanese Patent Office in counterpart Japanese Application No. 2016-053464.
Ying Chen et al: "Conforming bitstreams starting with CRA pictures", Joint Collaborative Team on Video Coding (JCT-VC) of ITU-T SG16 WP3 and ISO/IEC JTC1/SC29/WG11,7th Meeting: Geneva, CH, Nov. 21-30, 2011, Doc: JCTVC-G319, pp. 1-6 (7 pages total).
Communication issued Feb. 4, 2017, issued by the State Intellectual Property Office of People's Republic of China in counterpart Chinese Patent Application No. 201280042854.5.
Communication dated Apr. 17, 2017, issued by the Russian Patent Office in counterpart Russian application No. 2016129590/08.
Communication dated Aug. 25, 2017 in Taiwanese Intellectual Property Office in counterpart Taiwan Patent Application No. 106105704.

* cited by examiner

CODING UNITS (1010)

PREDICTION UNITS (1060)

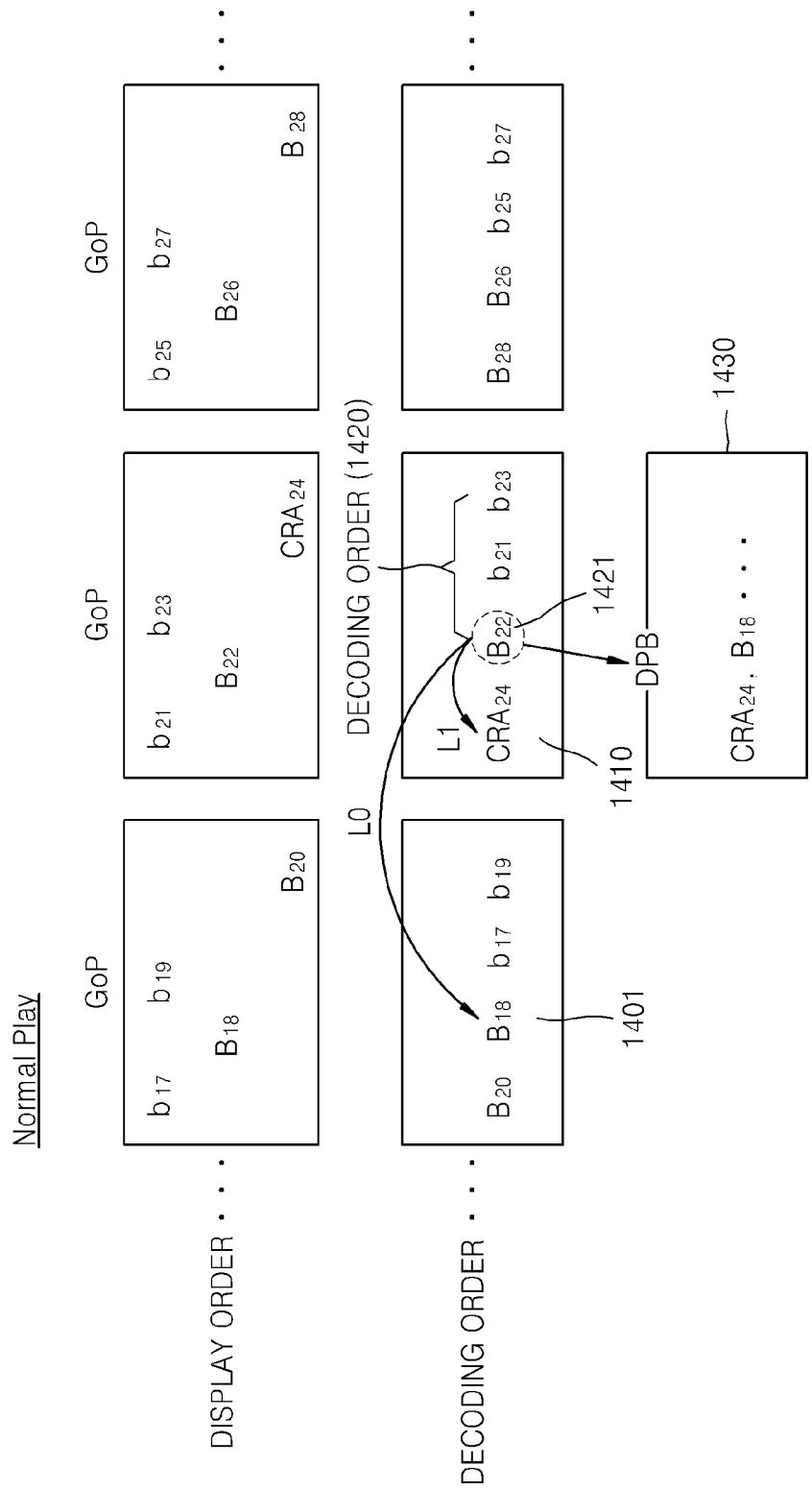

METHOD AND APPARATUS FOR MULTIPLEXING AND DEMULTIPLEXING VIDEO DATA TO IDENTIFY REPRODUCING STATE OF VIDEO DATA

CROSS-REFERENCE TO RELATED PATENT APPLICATIONS

This application is a national stage entry under 35 U.S.C. §371(c) of International Patent Application No. PCT/KR2012/005256, filed Jul. 2, 2012, and claims priority from U.S. Provisional Patent Application No. 61/504,178, filed on Jul. 2, 2011 in the U.S. Patent and Trademark Office, and U.S. Provisional Patent Application No. 61/552,549, filed on Oct. 28, 2011 in the U.S. Patent and Trademark Office, the disclosures of which are incorporated herein in their entireties by reference.

BACKGROUND

1. Field.

Apparatuses and methods consistent with exemplary embodiments relate to encoding and decoding video, and more particularly, to a method and apparatus for multiplexing and de-multiplexing video data so as to identify whether a reproduction status of an intra picture that is reproduced in a decoding side is a random access reproduction status or a normal reproduction status.

2. Background Art

A video codec including ITU-T H.261, ISO/IEC MPEG-1 Visual, ITU-T H.262(ISO/IEC MPEG-2 Visual), ITU-T H.264, ISO/IEC MPEG-4 Visual and ITU-T H.264(ISO/IEC MPEG-4 AVC) performs prediction encoding on a macroblock via inter prediction or intra prediction, generates a bitstream containing encoded image data according to a predetermined format defined by each video codec, and outputs the bitstream.

SUMMARY

One or more exemplary embodiments defines a new type of an intra picture for random access reproduction, and provides a method and apparatus for identifying a normal reproduction status and a random access reproduction status by hardware or software related to a decoding apparatus.

According to one or more embodiments, a reproduction status of an intra picture may be identified via syntax included in predetermined transmission data.

According to one or more embodiments, a normal reproduction status and a random access reproduction status may be identified by hardware or software related to a decoding apparatus, so that it is possible to save a system resource that is used to decode pictures that are not required to be decoded.

According to one or more embodiments, there is provided a method of multiplexing video data so as to identify a reproduction status of the video data, the method including operations of encoding pictures forming the video data based on data units having a hierarchical structure; in response to a transmission request for the encoded data from a decoding apparatus, determining whether the transmission request is according to normal reproduction or is for a random access; and adding predetermined syntax to transmission unit data to multiplex an intra picture used in the random access and having leading pictures that precede the intra picture in a display order but are encoded after the intra picture in an encoding order, according to a result of the determining, wherein the predetermined syntax indicates which request from among a request via the normal reproduction and a request via the random access is related to the intra picture.

According to another embodiment, there is provided an apparatus for multiplexing video data so as to identify a reproduction status of the video data, the apparatus including a video encoder for encoding pictures forming the video data based on data units having a hierarchical structure; a reproduction status identifier for, in response to a transmission request for the encoded data from a decoding apparatus, determining whether the transmission request is according to normal reproduction or is for a random access; and a multiplexer for adding predetermined syntax to transmission unit data to multiplex an intra picture used in the random access and having leading pictures that precede the intra picture in a display order but are encoded after the intra picture in an encoding order, according to a result of the determining, wherein the predetermined syntax indicates which request from among a request via the normal reproduction and a request via the random access is related to the intra picture.

According to another embodiment, there is provided a method of de-multiplexing video data so as to identify a reproduction status of the video data, the method including operations of receiving transmission unit data used to multiplex a bitstream generated by encoding pictures forming the video data based on hierarchical-structure data units; obtaining predetermined syntax from the transmission unit data to multiplex an intra picture used in a random access and having leading pictures that precede the intra picture in a display order but are encoded after the intra picture in a decoding order, wherein the predetermined syntax indicates whether the intra picture is decoded according to a normal reproduction status or according to a random access status; and identifying whether the intra picture is reproduced according to normal reproduction or according to a random access, based on the obtained predetermined syntax.

According to another exemplary, there is provided an apparatus for de-multiplexing video data so as to identify a reproduction status of the video data, the apparatus including an inverse-multiplexer for receiving transmission unit data used to multiplex a bitstream generated by encoding pictures forming the video data based on hierarchical-structure data units, obtaining predetermined syntax from the transmission unit data to multiplex an intra picture used in a random access and having leading pictures that precede the intra picture in a display order but are encoded after the intra picture in a decoding order, wherein the predetermined syntax indicates whether the intra picture is decoded according to a normal reproduction status or according to a random access status; and a reproduction status identifier for identifying whether the intra picture is reproduced according to normal reproduction or according to a random access, based on the obtained predetermined syntax.

BRIEF DESCRIPTION OF THE DRAWINGS

FIGS. 14A and 14B illustrate a decoding process of a clean random access (CRA) picture in normal reproduction and a random access, according to an exemplary embodiment.

DETAILED DESCRIPTION

Hereinafter, exemplary embodiments will be described in detail with reference to the attached drawings. Throughout the specification, an image may include a still image and a moving picture and may be referred to as video. Also, throughout the specification, an image frame may be referred to as a picture.

Figure 1:
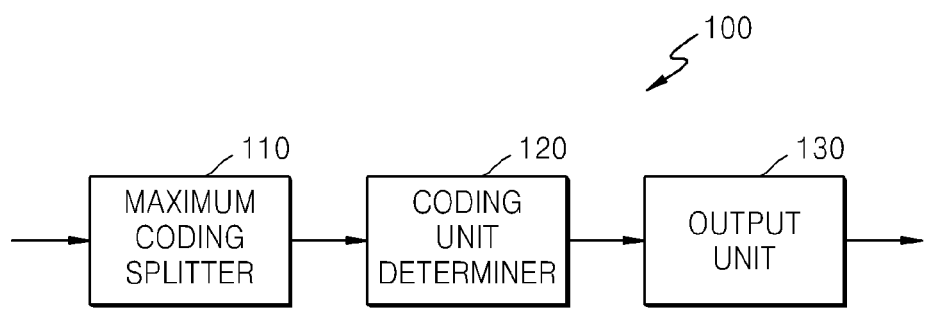
FIG. 1 is a block diagram of an apparatus for encoding a video, according to an exemplary embodiment.

FIG. 1 is a block diagram of a video encoding apparatus 100, according to an embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and a length that are each a multiple of 2 and greater than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The maximum coding unit is hierarchically split into coding units according to depths, and, as the depth increases, number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment is an index related to the number of splitting times from a maximum coding unit to a minimum coding unit. A first maximum depth according to an embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4^1 transformation units, and the size of the transformation unit is thus N×N, and may be 2 when each of the height and width of the current coding unit is split into four equal parts, totally split into 4^2 transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment may be a rectangular data unit obtained by splitting the minimum coding unit constituting the lowermost depth by 4, and may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

The maximum coding unit splitter 110 and the coding unit determiner 120 correspond to video coding layers that determine a reference frame of each of image frames forming an image sequence by performing motion estimation and motion compensation on each image frame of the image sequence according to coding units, and encode each image frame by using the determined reference frame.

Also, as will be described later, the output unit 130 maps syntax (max_dec_frame buffering) by a unit of a network abstraction layer (NAL) and thus generates a bitstream, wherein the syntax indicates a maximum size of a buffer required for a decoder to decode the image frames, syntax (num_reorder_frames) indicating the number of image frames required to be reordered, and syntax (max_latency_increase) indicating latency information of an image frame that has the greatest difference between an encoding order and a display order and that is from among the image frames forming the image sequence.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
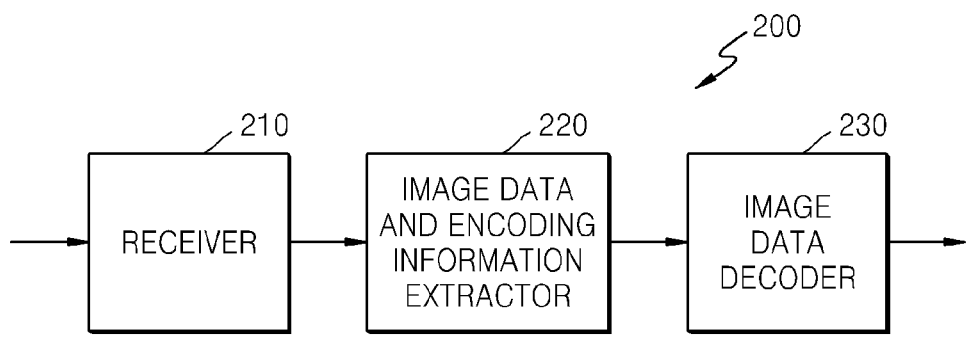
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

Also, the receiver 210 and the image data and encoding information extractor 220 perform an NAL decoding process in which syntax (max_dec_frame buffering) indicating a maximum size of a buffer required for a decoder to decode image frames, syntax (num_reorder_frames) indicating the number of image frames required to be reordered, and syntax (max_latency_increase) indicating latency information of an image frame that has the greatest difference between an encoding order and a display order and that is from among the image frames forming an image sequence are obtained from a bitstream and are output to the image data decoder 230.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
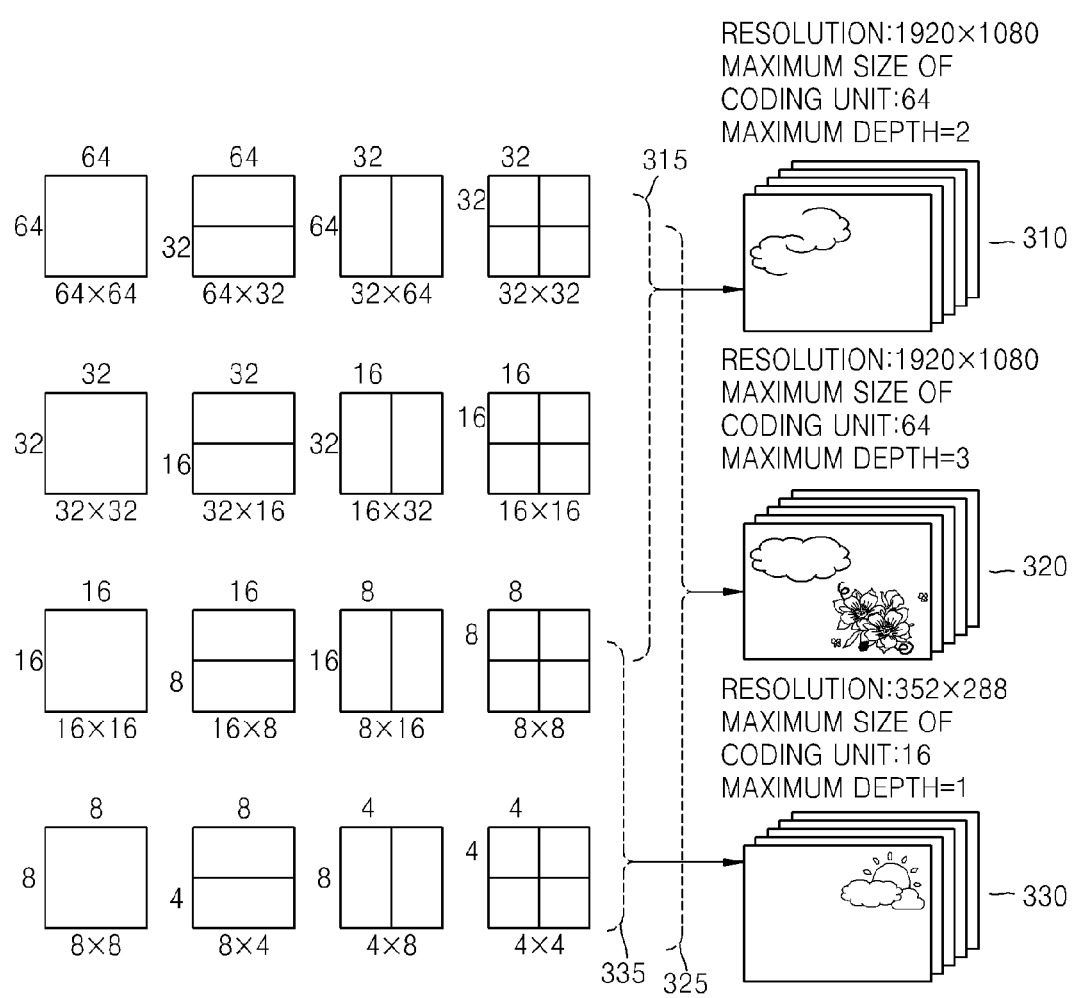
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
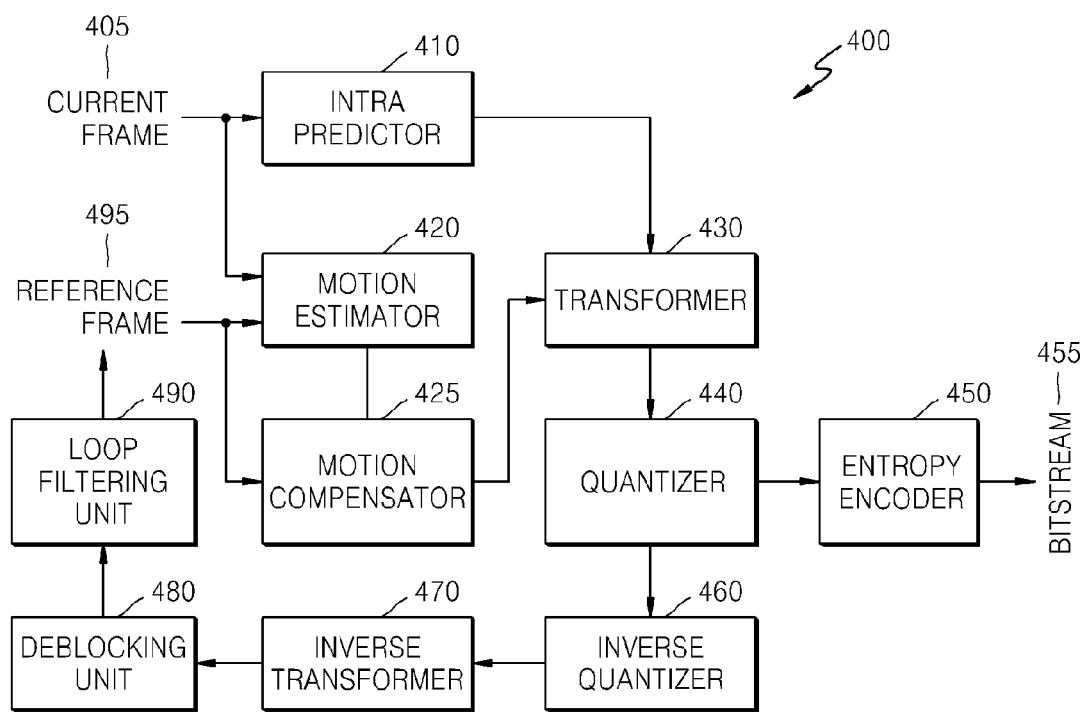
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450. In particular, the entropy encoder 450 may map maximum decoded frame buffering syntax (max_dec_frame buffering) by a unit of a NAL and thus may generate a bitstream, wherein the maximum decoded frame buffering syntax (max_dec_frame buffering) indicates a maximum size of a buffer required for a decoder to decode image frames, number-of-reorder-frames syntax (num_reorder_frames) indicating the number of the image frames required to be reordered, maximum latency frame syntax (MaxLatencyFrame) indicating a maximum value of a difference value between an encoding order and a display order of the image frames forming an image sequence, or maximum latency increase syntax (max_latency_increase) to determine the maximum latency frame syntax(MaxLatencyFrame). In particular, the entropy encoder 450 according to the present embodiment includes the maximum decoded frame buffering syntax (max_dec_frame buffering) indicating a maximum size of a buffer required for a decoder to decode image frames, the number-of-reorder-frames syntax (num_reorder_frames) indicating the number of the image frames required to be reordered, and the maximum latency increase syntax (max_latency_increase) to determine the maximum latency frame syntax (MaxLatencyFrame), as essential elements, in a sequence parameter set (SPS) that is header information including information related to encoding of the entire image sequence.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
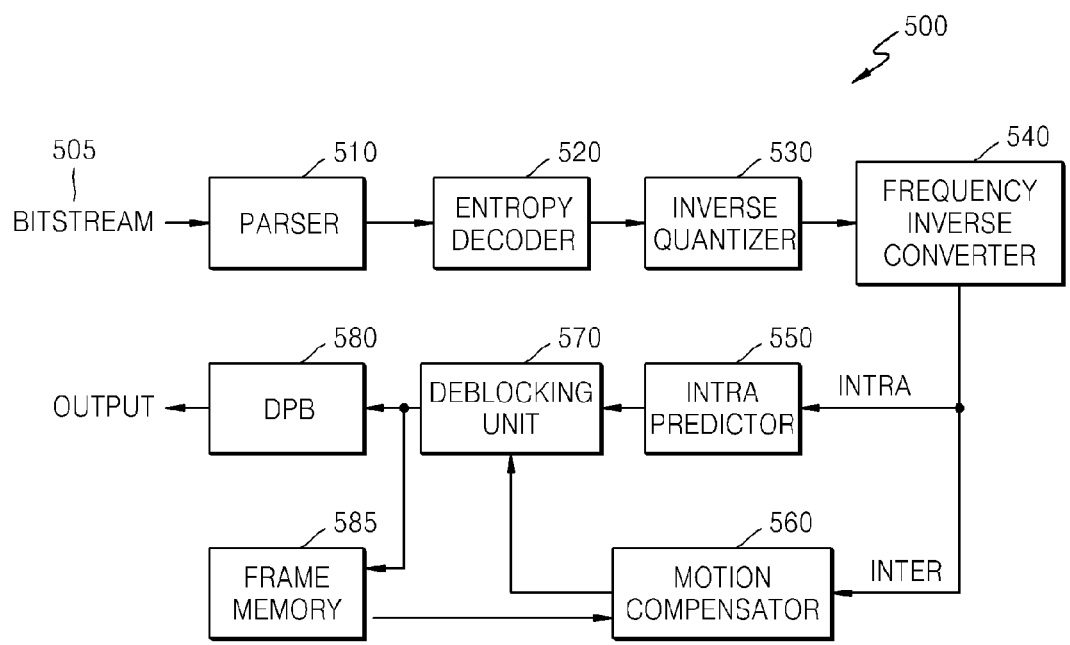
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. In particular, the parser 510 obtains maximum decoded frame buffering syntax (max_dec_frame buffering) indicating a maximum size of a buffer required to decode image frames included as an essential element in an SPS, number-of-reorder-frames syntax (num_reorder_frames) indicating the number of the image frames required to be reordered, and maximum latency increase syntax (max_latency_increase) to determine a maximum latency frame syntax (MaxLatencyFrame) from a bitstream and outputs them to an entropy decoder 520. In FIG. 5, the parser 510 and the entropy decoder 520 are separate elements. However, the obtainment of the image data and the obtainment of each item of syntax information related to the encoded image data, which are performed by the parser 510, may be implemented to be performed by the entropy decoder 520.

The encoded image data is output as inverse quantized data through the entropy decoder 520 and an inverse quantizer 530, and the inverse quantized data is restored to image data in a spatial domain through a frequency inverse converter 540.

An intra predictor 550 performs intra prediction on coding units in an intra mode with respect to the image data in the spatial domain, and a motion compensator 560 performs motion compensation on coding units in an inter mode by using a reference frame 585.

The image frames that are restored while passing through the intra predictor 550 and the motion compensator 560 may be post-processed through the deblocking unit 570 and may be output to a decoded picture buffer (DPB) 580. The DPB 580 stores a reference frame, changes a display order of the image frames, and stores the restored image frames so as to output the image frames. The DPB 580 stores the restored image frames, and sets a maximum size of a buffer required to normally decode the image sequence, by using the maximum decoded frame buffering syntax (max_dec_frame buffering) indicating the maximum size of the buffer required to decode the image frames, which is output from the parser 510 or the entropy decoder 520.

Also, the DPB 580 may determine whether or not to output a reference image frame that is previously decoded and stored, by using the number-of-reorder-frames syntax (num_reorder_frames) indicating the number of the image frames required to be reordered, and the maximum latency increase syntax (max_latency_increase) to determine the maximum latency frame syntax (MaxLatencyFrame). A process of outputting the reference image frame stored in the DPB 580 will be described in detail later.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the frequency inverse converter 540, the intra predictor 550, the motion compensator 560, the deblocking unit 570, and the loop filtering unit 580 may perform decoding operations based on coding units having a tree structure for each maximum coding unit. Specifically, the intra prediction 550 and the motion compensator 560 may determine partitions and a prediction mode for each of the coding units having a tree structure, and the frequency inverse converter 540 may determine a size of a transformation unit for each coding unit.

Figure 6:
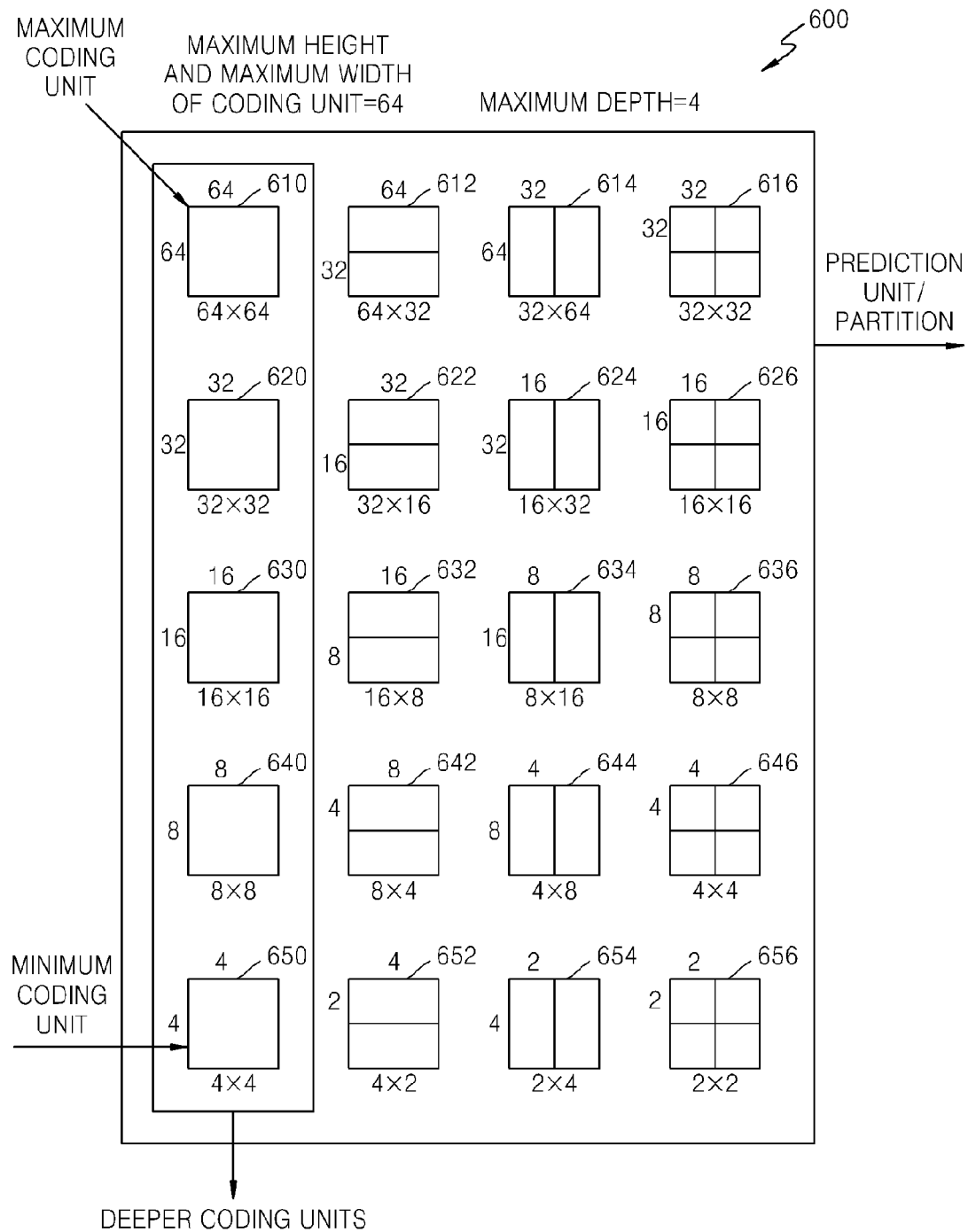
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition having a size of 64×64 included in the coding unit 610, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition having a size of 32×32 included in the coding unit 620, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth may be split into partitions included in the coding unit 650, i.e. a partition having a size of 4×4 included in the coding unit 650, partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
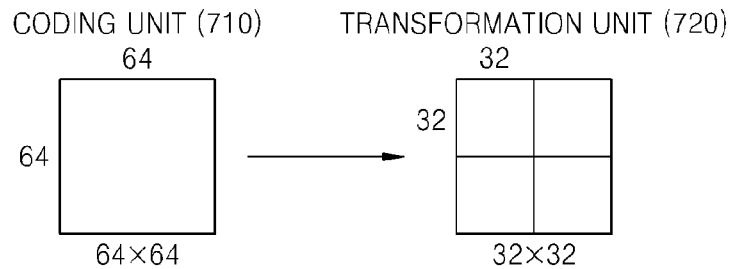
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
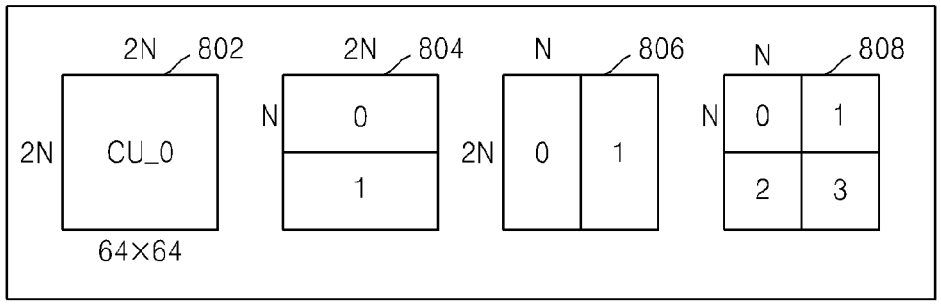
FIG. 8 is a diagram for describing encoding information of coding units corresponding to a coded depth, according to an exemplary embodiment.
Figure 8:
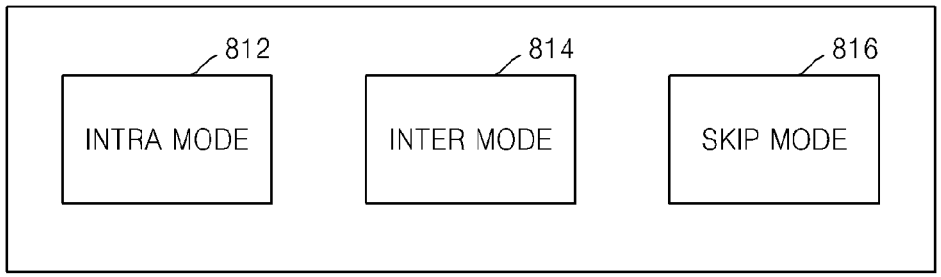
Figure 8:
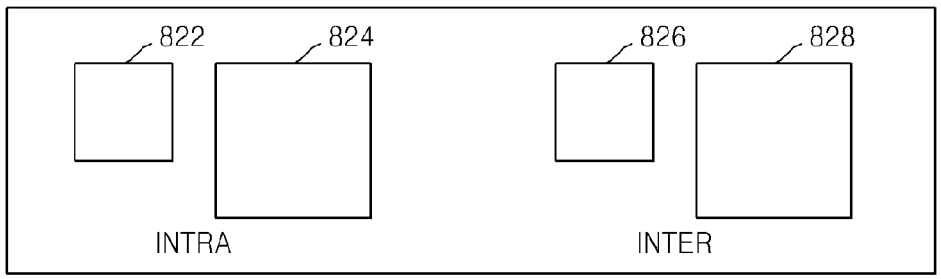

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
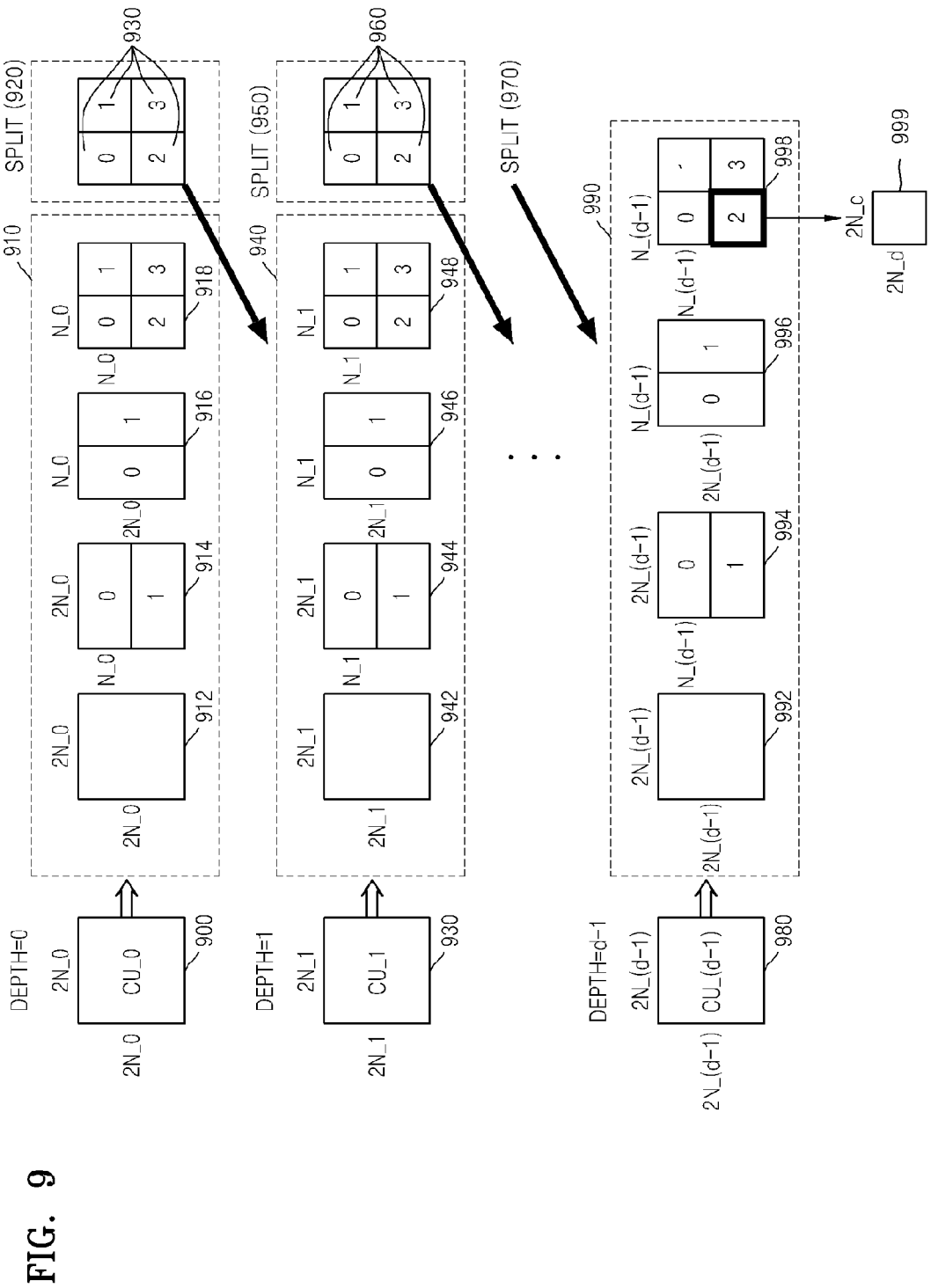
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode.

Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
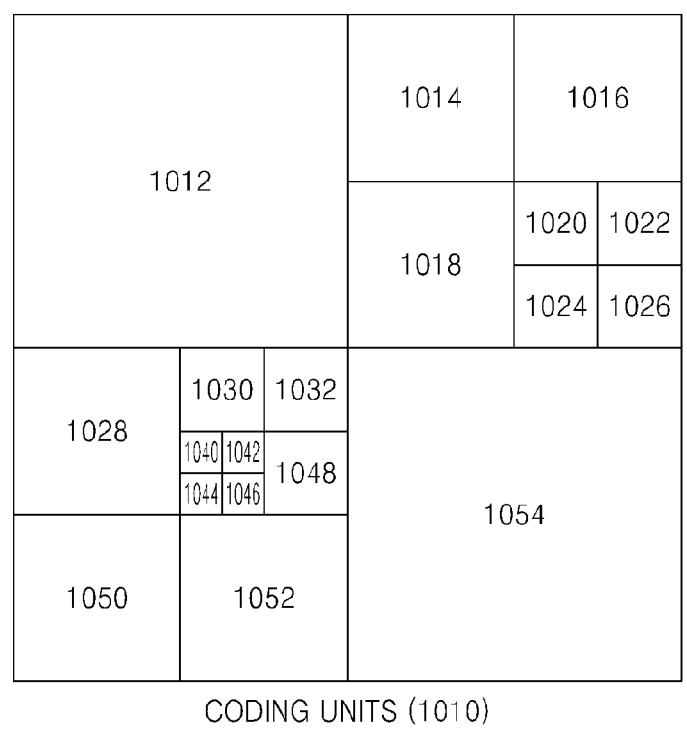
FIGS. 10 through 12 are diagrams for describing a relationship between coding units, prediction units, and transformation units, according to an exemplary embodiment.
Figure 11:
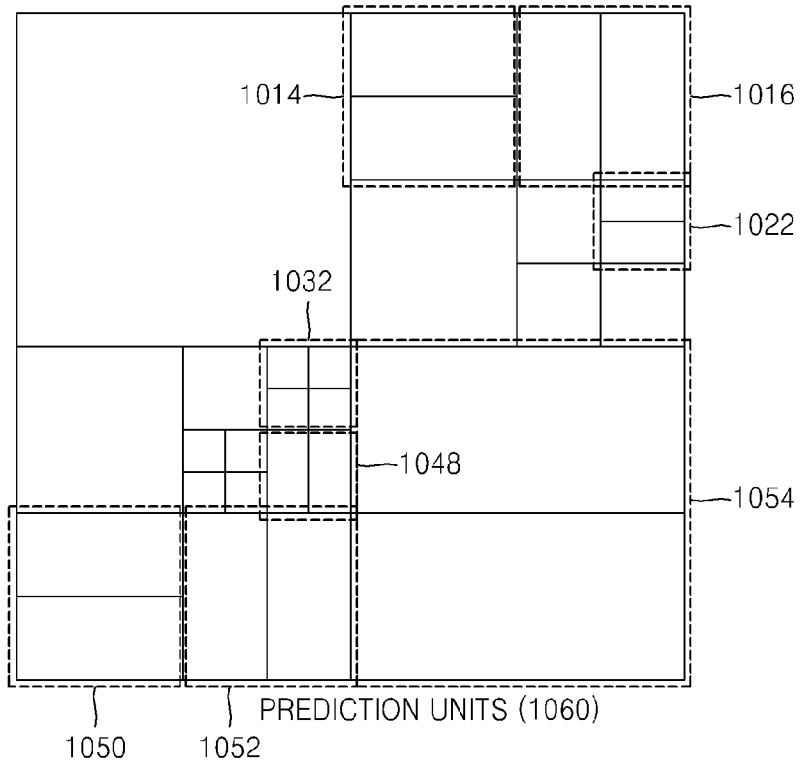
Figure 12:
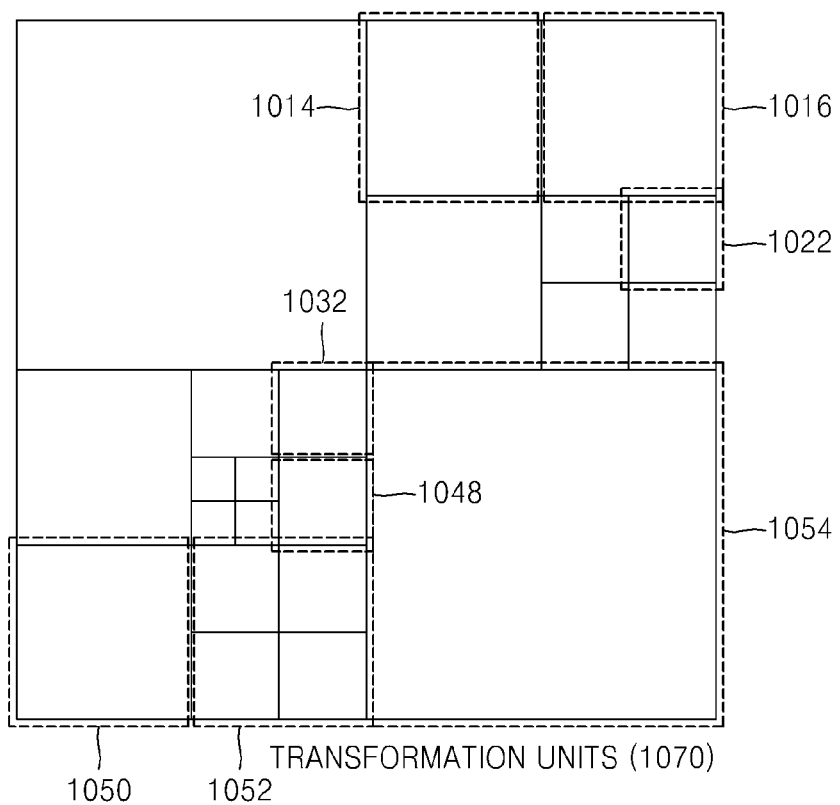

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
| --- | --- | --- | --- | --- | --- |
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
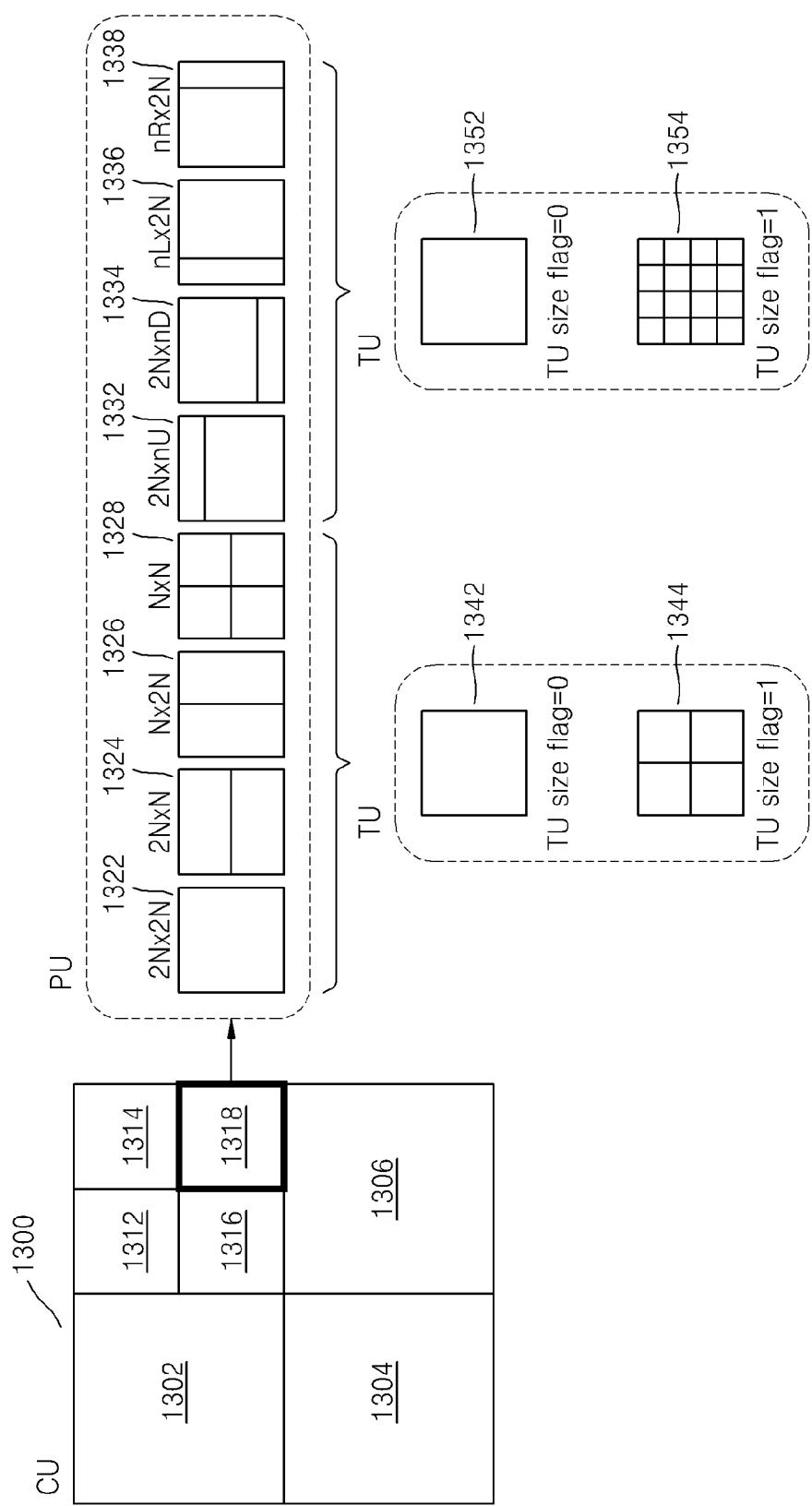
FIG. 13 is a diagram for describing a relationship between a coding unit, a prediction unit or a partition, and a transformation unit, according to encoding mode information.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

As described above, the video encoding apparatus 100 and the video decoding apparatus 200 according to one or more exemplary embodiments perform encoding and decoding by splitting a maximum coding unit by using a coding unit equal to or less than the maximum coding unit. The data encoded in the video encoding apparatus 100 is multiplexed by using a transmission data unit appropriate for a protocol or a format of a communication channel, a storage media, a video editing system, a media framework, or the like, and the transmission data unit is transmitted to the video decoding apparatus 200.

In a case of reproduction of video data, the video decoding apparatus 200 restores the video data according to one of a trick play manner and a normal play manner and reproduces the video data. The trick play manner includes a normal play manner, a fast-forward manner or a fast-backward manner, and a random access manner. According to the normal play manner, all pictures included in the video data are sequentially processed and reproduced. According to the fast-forward manner or the fast-backward manner, a reference picture, i.e., an I picture in every predetermined period is selected and reproduced in a forward or backward manner according to a reproduction speed. According to the random access manner, reproduction is performed with a skip to a key picture, i.e., an I picture at a predetermined position. According to the H.264 standard, an instantaneous decoder refresh (IDR) picture is used as the key picture for the random access manner. The IDR picture is an intra picture to refresh a decoding apparatus when a corresponding picture is decoded. In more detail, when the IDR picture is decoded, a DPB marks a picture other than the IDR picture, which is previously decoded, as a non-reference picture, and a picture order count (POC) is also initialized. Also, a picture that is decoded after the IDR picture may always be behind the IDR picture in a display order, and may be decoded while not referring to a picture before the IDR picture.

According to the present embodiment, in addition to the IDR picture, a clean random access (CRA) picture is used as the key picture for the random access manner. The CRA picture may be referred to as a clean decoding refresh (CDR) picture or a deferred decoding refresh (DDR) picture. The CRA picture is an intra picture having pictures that precede in the display order but are encoded (or decoded) after the CRA picture in an encoding (or decoding) order. Hereinafter, a picture that is in the same group of pictures (GOP) as the CRA picture and that precedes the CRA picture in the display order but is encoded (or decoded) after the CRA picture in the encoding (or decoding) order is defined as a leading picture.

The IDR picture and the CRA picture are common in that they are key pictures for the random access manner and are intra pictures to be encoded (or decoded) without referring to another picture. With respect to the IDR picture, a picture that follows the IDR picture in the encoding (or decoding) order does not precede the IDR picture in the display order. However, as described above, with respect to the CRA picture, the leading picture follows the CRA picture in the encoding (or decoding) order but precedes the CRA picture in the display order. The decoding order and the encoding order indicate orders in a decoder and an encoder by which pictures are processed, and an encoding order of pictures is equal to a decoding order of the pictures. Accordingly, throughout the specification, the encoding order may mean the decoding order, or the decoding order may mean the encoding order.

Figure 14B:
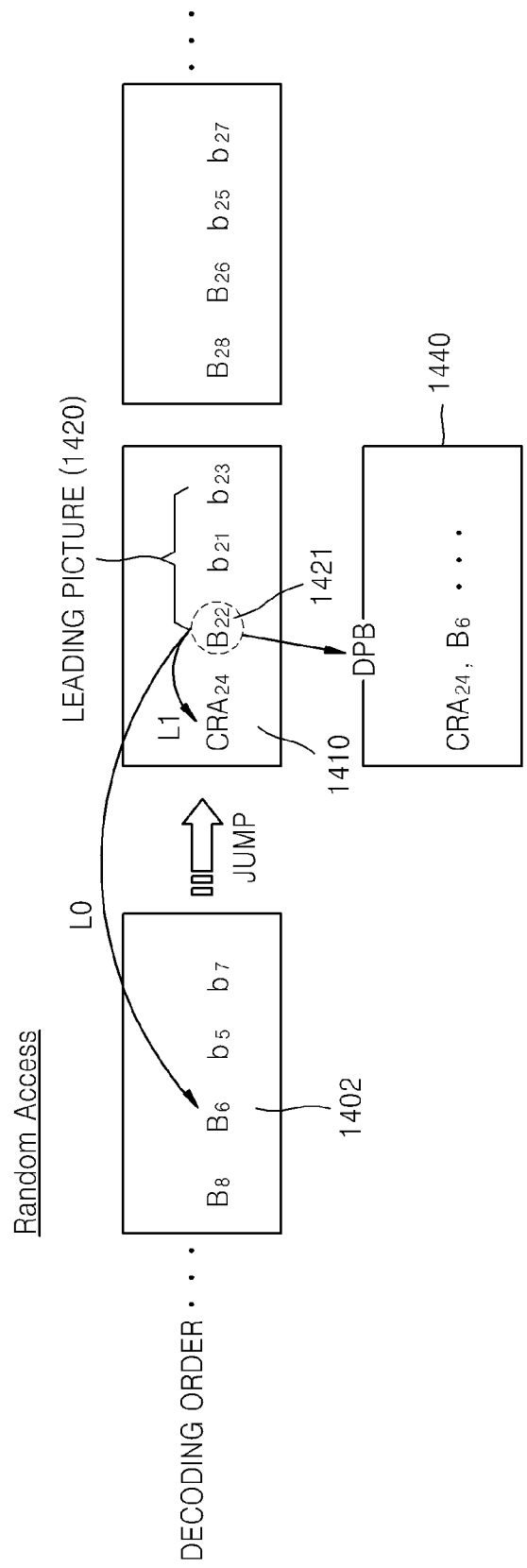

FIGS. 14A and 14B illustrate a decoding process of a CRA picture in normal reproduction and a random access, according to an exemplary embodiment.

In FIGS. 14A and 14B, $B_i$ and $b_i$ are Bi-predictive pictures that are predicted by using L0 prediction and L1 prediction, in which i indicates a display order, i.e., a POC. Also, $B_i$ having a capital letter 'B' indicates a picture that is used as a reference picture of another picture, and $b_i$ having a lowercase letter 'b' indicates a picture that is not used as a reference picture of another picture.

Referring to FIG. 14A, in the normal reproduction, i.e., when all pictures are decoded and reproduced, leading pictures 1420 that are decoded after a $CRA_{24}$ picture 1410 may be normally decoded by referring to a reference picture that is previously decoded. For example, when a $B_{22}$ picture 1421 is bi-directionally predicted by using the L0 prediction that refers to a $B_{18}$ picture 1401 and the L1 prediction that refers to the $CRA_{24}$ picture 1410, in the normal reproduction, the $B_{22}$ picture 1421 may be normally decoded by referring to the $CRA_{24}$ picture 1410 and the $B_{18}$ picture 1401 which are previously decoded and stored in a DPB 1430.

Referring to FIG. 14B, in a case where the $CRA_{24}$ picture 1410 is decoded via the random access after a $B_6$ picture 1402 is decoded, the L0 prediction for prediction of the $B_{22}$ picture 1421 determines a reference picture according to a reference picture index in a direction of the L0 prediction. In this case, the $B_6$ picture 1402 that is previously decoded and stored in a DPB 1440 may be determined as the reference picture for the L0 prediction of the $B_{22}$ picture 1421. In this case, the reference picture for the L0 prediction of the $B_{22}$ picture 1421 has to be the $B_{18}$ picture 1401, but, due to the random access, a picture that refers to reference pictures between the $B_6$ picture 1402 and the $CRA_{24}$ picture 1410 cannot be normally decoded.

Also, referring back to FIG. 14A, because the leading pictures 1420 precede the $CRA_{24}$ picture 1410 in a display order, after the $CRA_{24}$ picture 1410 is decoded and displayed via the random access, the leading pictures 1420 are not displayed and thus are not required to be decoded.

However, the video decoding apparatus 200 simply and sequentially decode and output a plurality of pieces of input video data, and thus cannot recognize whether the leading pictures 1420 are pictures that are decoded after the $CRA_{24}$ picture 1410 in the normal reproduction or via the random access. In other words, the video decoding apparatus 200 cannot recognize whether the $CRA_{24}$ picture 1410 is a picture that is decoded via the random access or is decoded in the normal reproduction.

Thus, one or more exemplary embodiments may provide multiplexing and de-multiplexing methods by which syntax for identification of a reproduction status of a CRA picture is added to data in a predetermined transmission unit, wherein the data is obtained by multiplexing the CRA picture that is encoded to be identified whether the CRA picture is encoded according to a random access or is encoded according to normal reproduction.

First, a video data multiplexing apparatus and method thereof will be described.

Figure 15:
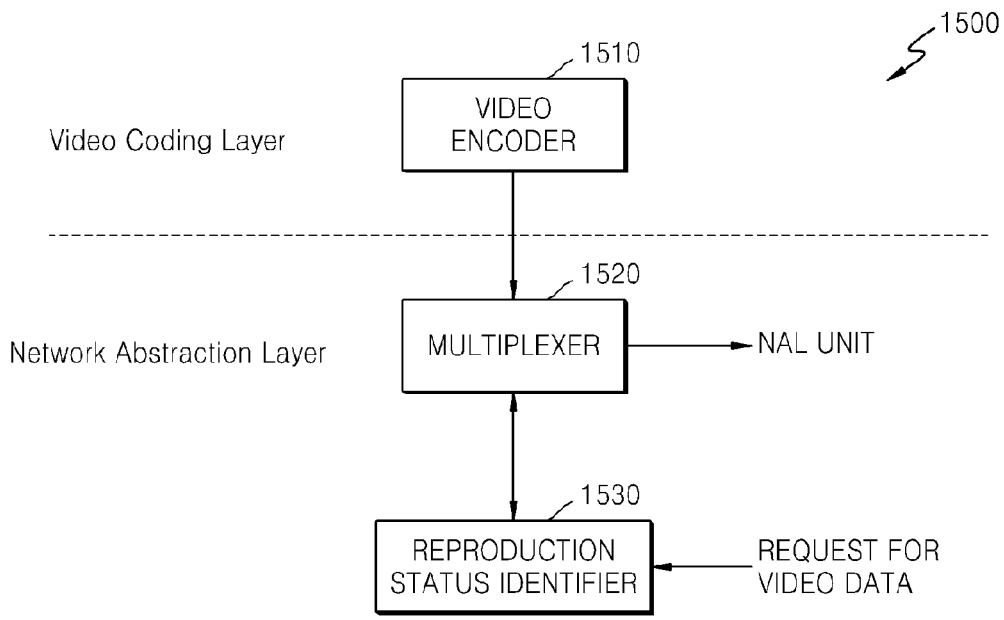
FIG. 15 illustrates a structure of a video data multiplexing apparatus, according to an exemplary embodiment.

FIG. 15 illustrates a structure of a video data multiplexing apparatus 1500, according to an exemplary embodiment.

Referring to FIG. 15, the video data multiplexing apparatus 1500 includes a video encoder 1510, a multiplexer 1520, and a reproduction status identifier 1530.

The video encoder 1510 corresponds to the video encoding apparatus 100 of FIG. 1, and encodes video data based on the hierarchical coding unit in a video coding layer in which the encoding of the video data is processed. The multiplexer 1520 multiplexes the video data by using a transmission data unit appropriate for a protocol or a format of a communication channel, a storage media, a video editing system, a media framework, or the like. As will be described later, the multiplexer 1520 may multiplex the video data by using a NAL unit that is a transmission unit in an NAL.

When there is a transmission request for the encoded video data from a client connected via the communication channel, an apparatus managing the storage media, the video editing system, and the media framework (hereinafter, collectively referred to as a "decoding apparatus"), the reproduction status identifier 1530 identifies whether the transmission request is for sequential reproduction of the video data according to normal reproduction or is for transmission of the video data according to a random access. The reproduction status identifier 1530 may compare a display time of a picture requested by the decoding apparatus with a display time of a picture currently displayed by a current decoding apparatus, and then may identify that the transmission request of the video data occurs according to the random access.

The multiplexer 1520 adds predetermined syntax to the NAL unit including information about a CRA picture that is a key picture for the random access, based on the identification result by the reproduction status identifier 1530, wherein the predetermined syntax indicates which request from among a request via the normal reproduction and a request via the random access is related to the CRA picture.

Figure 16:
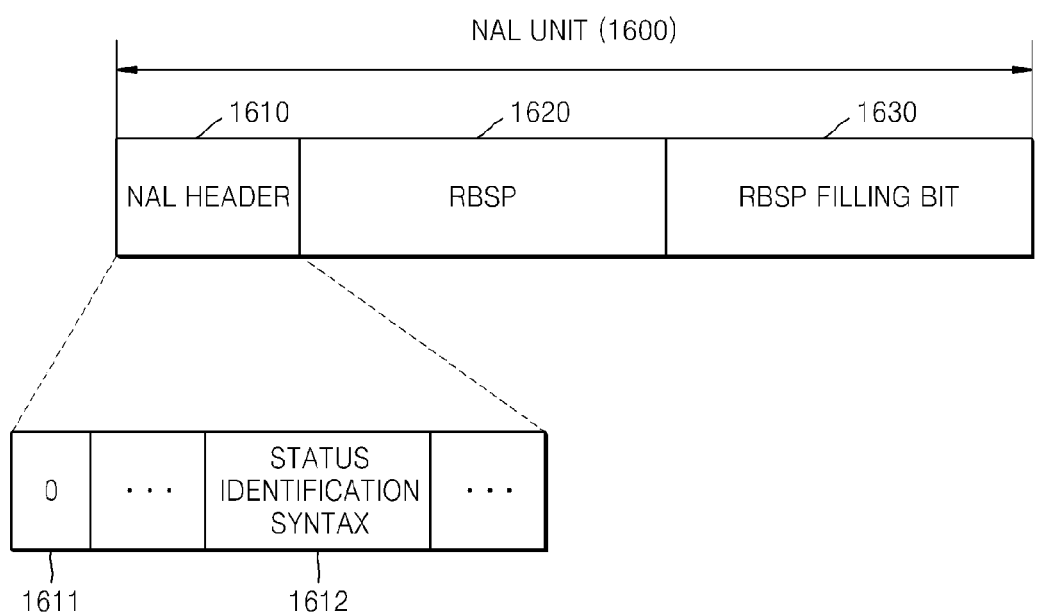
FIG. 16 illustrates a structure of a network abstraction layer (NAL) unit, according to an exemplary embodiment.

FIG. 16 illustrates a structure of an NAL unit 1600, according to an exemplary embodiment.

Referring to FIG. 16, the NAL unit 1600 is formed of an NAL header 1610 and a raw byte sequence payload (RBSP) 1620. A RBSP filling bit 1630 is a length adjustment bit attached to an end of the RBSP 1620 so as to express a length of the RBSP 1620 as an 8-bit multiple. The RBSP filling bit 1630 has a pattern such as '100 . . . ' that starts with '1' and continues with sequential '0' determined according to the length of the RBSP 1620. In this regard, by searching for '1' that is an initial bit value, a position of a last bit of the RBSP 1620 which is right before the initial bit value may be determined.

The NAL header 1610 includes a forbidden_zero_bit 1611 having a value of 0, a flag nal_ref_idc indicating whether the NAL unit 1600 includes a slice to be a reference picture, and the like. In particular, the NAL header 1610 according to the present embodiment includes status identification syntax 1612 indicating which request from among a request via normal reproduction and a request via a random access is related to a CRA picture that is added to the NAL unit 1600 including information about the CRA picture.

The status identification syntax 1612 to identify a reproduction status of the CRA picture may be included in an identifier (nal unit type) indicating a type of the NAL unit 1600. That is, an NAL unit that is used to decode a CRA picture provided according to a request via normal reproduction may have an identifier (nal unit type) that is a different type from an identifier (nal unit type) of an NAL unit that is used to decode a CRA picture provided according to a request via a random access.

Table 2 shows types of the NAL unit 1600 according to values of an identifier (nal unit type).

TABLE 2

| nal_unit_type | Types of NAL unit |
|---|---|
| 0 | Unspecified |
| 1 | Picture slice other than RAP, TFD, TLA pictures |
| 2 | TFD picture slice |
| 3 | TLA picture slice other than TFD |
| 4, 5 | Slice of CRA picture |
| 6, 7 | Slice of BLA picture |
| 8 | Slice of IDR picture |
| 9-24 | Reserved for future extension |
| 25 | VPS |
| 26 | SPS |
| 27 | PPS |
| 28 | APS |
| 29 | Access Unit (AU) delimiter |
| 30 | Filler data |
| 31 | Supplemental Enhancement Information (SEI) |
| 32-47 | Reserved for future extension |
| 48-63 | Unspecified |

The multiplexer 1520 allocates different values of 4 and 5 in Table 2 above, as an identifier (nal unit type), to the NAL unit that is used to decode the CRA picture provided according to the request via the normal reproduction, and to the NAL unit that is used to decode the CRA picture provided according to the request via the random access. By doing so, the multiplexer 1520 may signal that an NAL unit including information about a CRA picture is which one from among a CRA picture provided according to normal reproduction and a CRA picture provided according to a random access.

Also, the multiplexer 1520 may use a flag as syntax added to a header of the NAL unit, wherein the flag is set to have one of different values of 0 and 1 with respect to the NAL unit used to decode the CRA picture provided according to the request via the normal reproduction, and the NAL unit used to decode the CRA picture provided according to the request via the random access.

Figure 17A:
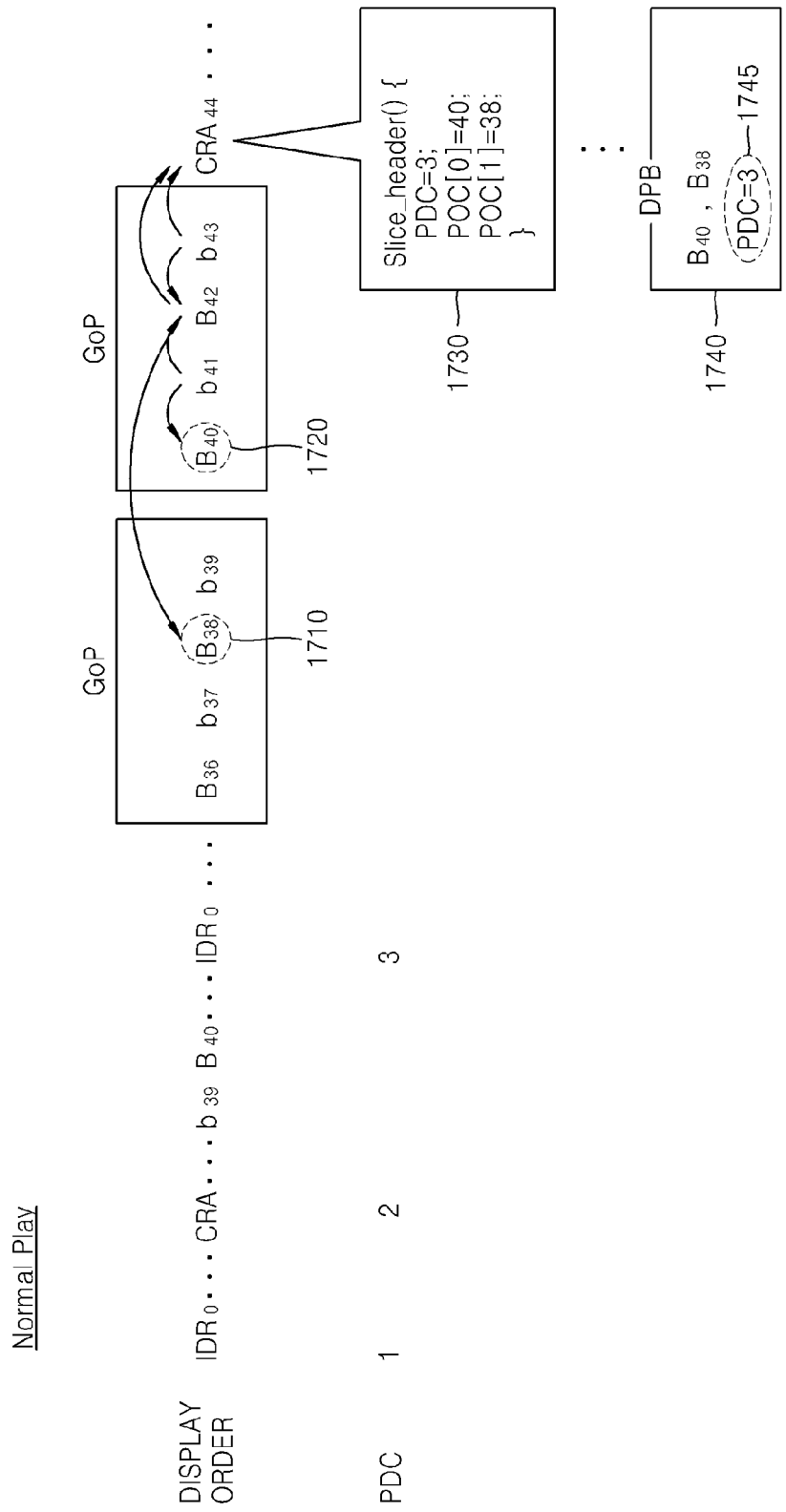
FIGS. 17A and 17B illustrate a decoding process of a CRA picture in normal reproduction and a random access, according to another exemplary embodiment.
Figure 17B:
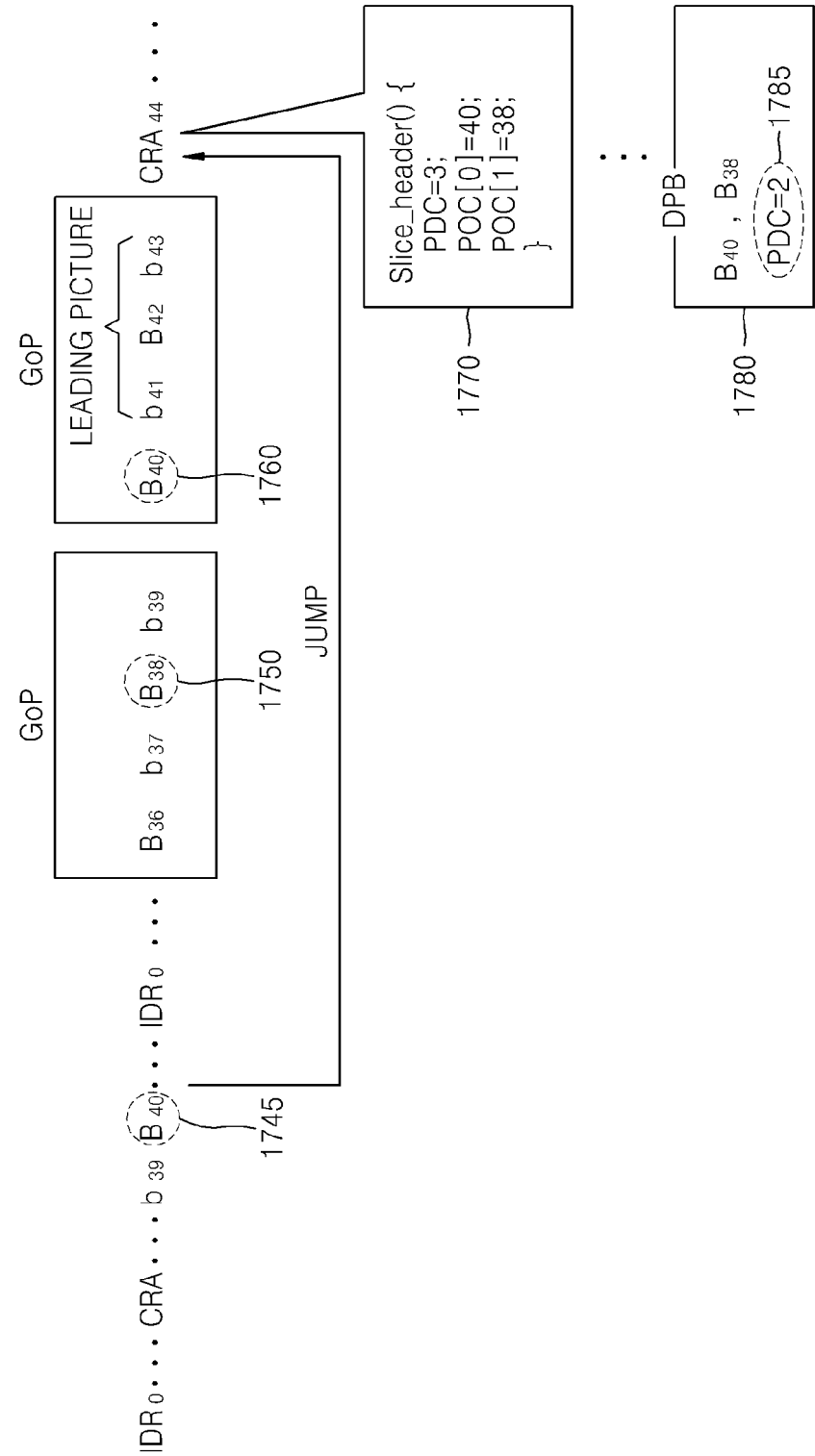

FIGS. 17A and 17B illustrate a decoding process of a CRA picture in normal reproduction and a random access, according to another exemplary embodiment.

According to the current embodiment, the multiplexer 1520 adds type information, which directly indicates the reproduction status of the CRA picture, to the NAL unit. In another embodiment, the multiplexer 1520 may not directly signal a type of the reproduction status of the CRA picture but may identify whether the CRA picture is reproduced according to the normal reproduction or is reproduced according to the random access, by using a counter of key pictures that are decoded before the CRA picture, and by using information about a POC of a picture that is used as a reference picture of leading pictures.

Referring to FIGS. 17A and 17B, a $B_{38}$ picture 1710 and a $B_{40}$ picture 1720 are pictures that are decoded before a $CRA_{44}$ picture and that are referred to by $b_{41}$, $B_{42}$, and $b_{43}$ pictures that are leading pictures. The $B_{38}$ picture 1710 is referred to by the $B_{42}$ picture that is the leading picture, and the $B_{40}$ picture 1720 is referred to by the $B_{41}$ picture that is the leading picture. The $B_{38}$ picture 1710 and the $B_{40}$ picture 1720 which precede a CRA picture in a decoding order and are used as reference pictures of the leading pictures are defined as a brother picture. The reason why the brother picture is defined is that it is possible to identify whether the CRA picture is reproduced according to normal reproduction or is reproduced according to a random access, by using a POC of the brother picture.

For example, referring to FIG. 17A, while pictures are sequentially decoded in a normal reproduction status, when the $CRA_{44}$ picture is decoded, the $B_{38}$ picture 1710 and the $B_{40}$ picture 1720 that are previously decoded are stored in a DPB 1740. If a POC value of 38 of the $B_{38}$ picture 1710, and a POC value of 40 of the $B_{40}$ picture 1720, which are brother pictures, are added to a slice header of the $CRA_{44}$ picture, a decoder may compare a POC of pictures that are previously decoded and stored in the DPB 1740 at a time of decoding the $CRA_{44}$ picture with the POC of the brother pictures included in the slice header of the $CRA_{44}$ picture and thus may identify whether the $CRA_{44}$ picture is reproduced according to the random access or is reproduced according to the normal reproduction. Since a reproduction order, i.e., a decoding order, jumps to the $CRA_{44}$ picture in the reproduction according to the random access, if the POC of the pictures that are previously decoded and stored in the DPB 1740 at a time of decoding the $CRA_{44}$ picture does not match with the POC of the brother pictures, there is a high possibility that the $CRA_{44}$ picture is reproduced according to the random access.

However, there is also a possibility that the $CRA_{44}$ picture may be misidentified as to whether the $CRA_{44}$ picture is reproduced according to the random access or is reproduced according to the normal reproduction, by using only information about the POC of the brother pictures.

For example, referring to FIG. 17B, in a case where the $CRA_{44}$ picture is decoded according to the random access after a $B_{40}$ picture 1745 is decoded, when the $CRA_{44}$ picture is decoded, a POC value of 40 of the $B_{40}$ picture 1745 is stored in a DPB 1780, and a POC value of 40 of a brother picture stored in the slice header of the $CRA_{44}$ picture is equal to the POC value of a previous picture stored in the DPB 1780, so that a decoder may misidentify that the $CRA_{44}$ picture is reproduced according to the normal reproduction. As described above, a reproduction status of a CRA picture may not be correctly identified by using only information about a POC of a brother picture. This is because every time an IDR picture is decoded, a POC is reset, so that a reference picture that is different from an actual reference picture to be referred to by brother pictures in a random access may have the same POC as a POC of the brother pictures.

Thus, the multiplexer 1520 adds POC information of a brother picture to syntax of transmission unit data of a CRA picture, obtains a count from a POC discontinuity counter (PDC) that is a counter having a value increasing by 1 whenever a POC is reset or the CRA picture is encoded while pictures before the CRA picture are encoded, and adds the count from the PDC to the syntax.

Referring back to FIG. 17A, as described above, the multiplexer 1520 increases the count from the PDC by 1 whenever the POC is reset or the CRA picture is encoded while the pictures are encoded. Since the POC is reset whenever the IDR picture is encoded, a value of the PDC increases by 1 whenever the IDR picture is encoded, and the value of the count from the PDC increases by 1 when a previous CRA picture except for the $CRA_{44}$ picture is encoded. The multiplexer 1520 adds the value of the PDC with the POC of the brother pictures to a header 1730 of the transmission unit data of the CRA picture. The decoder in the same manner as an encoder increases the count from the PDC by 1 whenever the POC is reset while the input transmission unit data is decoded, i.e., whenever the IDR picture is decoded or the CRA picture is decoded. As illustrated in FIG. 17A, in a case of normal reproduction, when the $CRA_{44}$ picture is decoded, a PDC value included in the header 1730 of the transmission unit data used to multiplex the $CRA_{44}$ picture, and a PDC value 1745 counted while pictures are decoded by the decoder are all 3.

Referring back to FIG. 17B, in a case of a random access, one IDR picture and one CRA picture which are decoded before the $CRA_{44}$ picture exist, so that, when the $CRA_{44}$ picture is decoded according to the random access, a PDC value 1785 is 2, which is different from a PDC value having 3 and included in a header 1770 of transmission unit data that is used to multiplex the $CRA_{44}$ picture. Thus, based on the mismatch between the PDC values, the decoder may determine that a current CRA picture is reproduced according to the random access.

Figure 18:
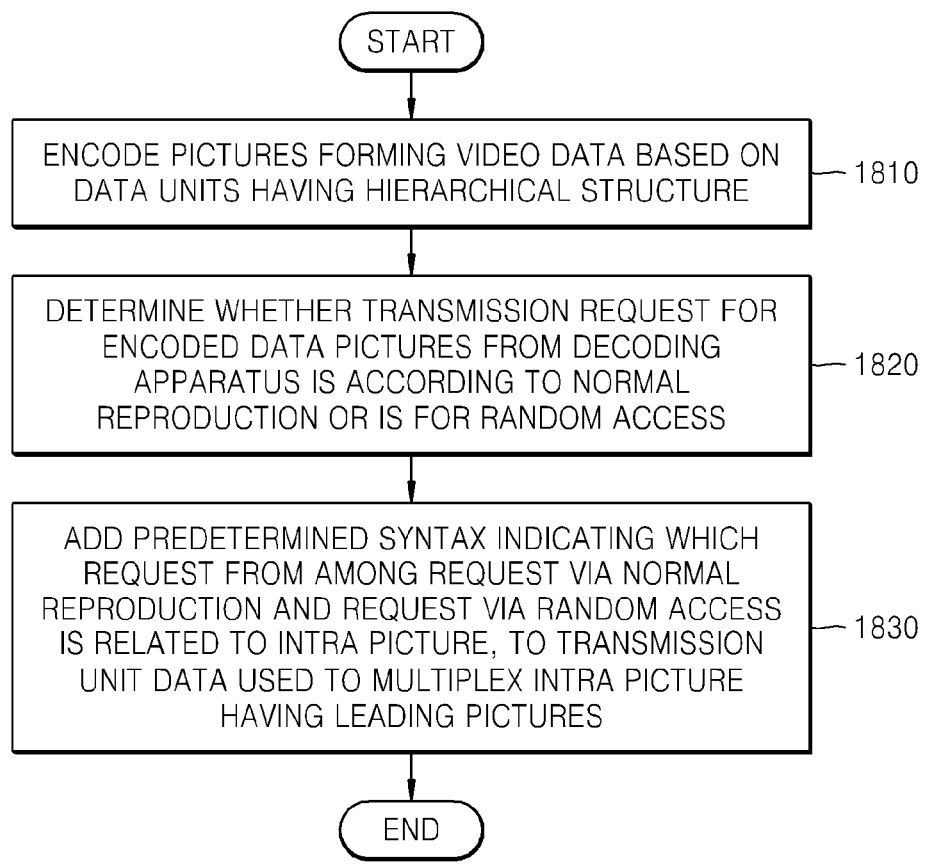
FIG. 18 is a flowchart of a method of multiplexing video data, according to an exemplary embodiment.

FIG. 18 is a flowchart of a method of multiplexing video data, according to an exemplary embodiment.

Referring to FIG. 18, in operation 1810, the video encoder 1510 encodes pictures forming video data based on data units having a hierarchical structure. As described above, the video encoder 1510 determines tree-structure encoding units including encoding units with encoding depths from among deeper encoding units according to depths which are hierarchically formed according to depths indicating a spatial split count of at least one maximum encoding unit obtained by splitting a picture forming video by using a maximum size encoding unit, determines a partition for prediction encoding for each of the encoding units with encoding depths, performs transformation based on hierarchical-structure transformation units, and then determines tree-structure transformation units. In the determination of a hierarchical data unit, a structure of an optimal hierarchical data unit may be determined based on a rate distortion (RD) cost.

In operation 1820, in response to a transmission request for encoded data from a decoding apparatus, the reproduction status identifier 1530 determines whether the transmission request is according to normal reproduction or is for a random access. As described above, the decoding apparatus may collectively indicate apparatuses for storing, reproducing, and editing encoded video data, and may include a client connected via a communication channel, an apparatus managing a storage media, a video edition system, a media framework, and the like.

In operation 1830, the multiplexer 1520 adds predetermined syntax to transmission unit data used to multiplex a CRA picture that is an intra picture having leading pictures, according to a result of the determination in operation 1820, wherein the predetermined syntax indicates which request from among a request via the normal reproduction and a request via the random access is related to the CRA picture. As described above, the leading picture means a picture that precedes the CRA picture in a display order but is encoded after the CRA picture in an encoding order. Also, the transmission unit data may be NAL data. Also, the multiplexer 1520 may add an identifier (nal unit type) indicating a type of an NAL unit to a header of the NAL unit so that an NAL unit that is used to multiplex a CRA picture provided according to the request via the normal reproduction may have an identifier (nal unit type) that is different from an identifier (nal unit type) of an NAL unit that is used to multiplex a CRA picture provided according to a request via the random access. Also, the multiplexer 1520 may add a flag to the header of the NAL unit, wherein the flag has a value of 0 or 1 according to the NAL unit used to multiplex the CRA picture provided according to the request via the normal reproduction, and the NAL unit used to multiplex the CRA picture provided according to the request via the random access. Also, the multiplexer 1520 may obtain a count from a PDC that increases by 1 whenever a POC is reset or the CRA picture is encoded while pictures are multiplexed, and may add POC information of a brother picture of the CRA picture, and the count from the PDC to the header of the NAL unit.

Figure 19:
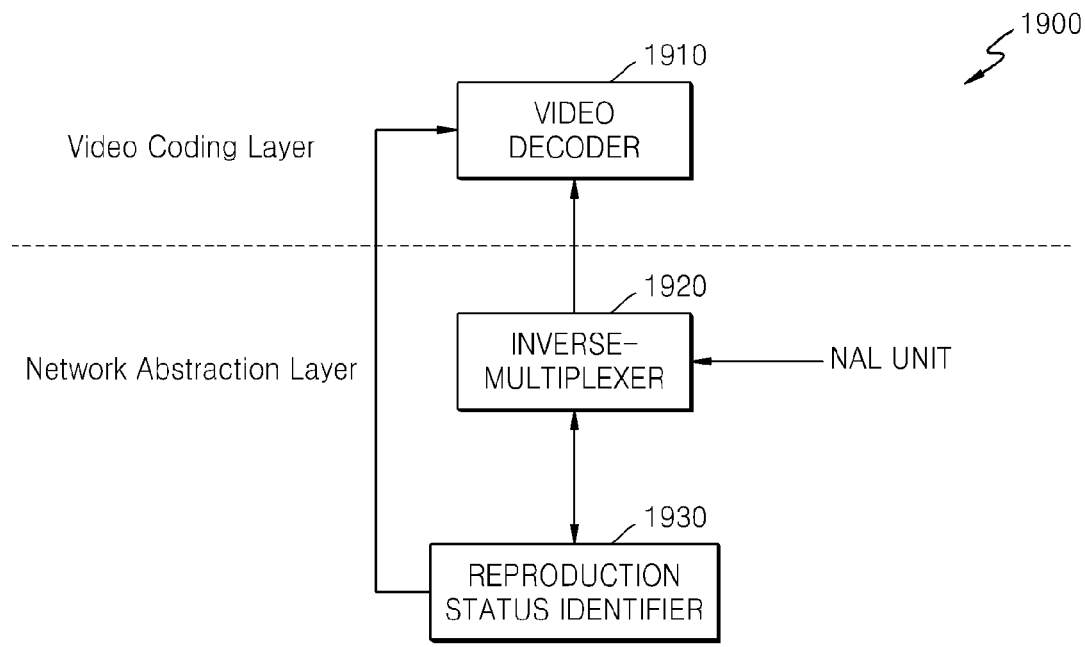
FIG. 19 illustrates a structure of a video data inverse-multiplexing apparatus 1900, according to an exemplary embodiment.

FIG. 19 illustrates a structure of a video data inverse-multiplexing apparatus 1900, according to an exemplary embodiment.

Referring to FIG. 19, the video data inverse-multiplexing apparatus 1900 includes a video decoder 1910, an inverse-multiplexer 1920, and a reproduction status identifier 1930.

The inverse-multiplexer 1920 receives transmission unit data, i.e., NAL unit data transmitted from the video data multiplexing apparatus 1500 of FIG. 15, and obtains syntax indicating whether a CRA picture is decoded according to a normal reproduction status or according to a random access status, from the NAL unit data that is used to multiplex the CRA picture.

The reproduction status identifier 1930 determines whether the CRA picture is reproduced according to normal reproduction or according to a random access, by using the obtained syntax.

As described above, when an NAL unit that is used to multiplex a CRA picture provided according to the request via the normal reproduction is set to have an identifier (nal unit type) different from an identifier (nal unit type) of an NAL unit that is used to multiplex a CRA picture provided according to a request via the random access, the reproduction status identifier 1930 may recognize a decoding status of a current CRA picture by referring to values of the identifiers (nal unit type). If a header of the NAL unit has added thereto a flag that has a value of 0 or 1 according to the NAL unit used to multiplex the CRA picture provided according to the request via the normal reproduction, and the NAL unit used to multiplex the CRA picture provided according to the request via the random access, the reproduction status identifier 1930 may recognize the decoding status of the current CRA picture by referring to information about the flag.

Also, when the header of the NAL unit includes a count from a PDC and POC information of a brother picture, the reproduction status identifier 1930 increases the count from the PDC whenever an IDR picture or a CRA picture is decoded while previous pictures are decoded, and determines a match between the count from the PDC that is obtained from the header of the NAL unit at a time of decoding the current CRA picture, and a PDC that counts in a decoding process. Also, the reproduction status identifier 1930 determines a match between a POC value of the brother picture of the CRA picture which is included in the header of the NAL unit, and a POC value of previous pictures stored in a DPB at a time of decoding the current CRA picture. If any one of the count from the PDC or the POC value does not match, the reproduction status identifier 1930 determines that the current CRA picture is reproduced according to the random access, and if both the count from the PDC and the POC value match, the reproduction status identifier 1930 determines that the current CRA picture is reproduced according to the normal reproduction. If the current CRA picture is reproduced according to the random access, it is not necessary to decode leading pictures of the current CRA, so that the reproduction status identifier 1930 notifies the video decoder 1910 that the leading pictures of the current CRA are not required to be decoded.

The video decoder 1910 corresponds to the video decoding apparatus 200 of FIG. 2 or the image decoder 500 of FIG. 5. The video decoder 1910 obtains encoded image data, and split information, partition type information, prediction mode information, transformation unit size information, and parameter set information related to an encoding process, which are about encoding units used to generate the encoded image data, from an NAL unit, and performs decoding.

Figure 20:
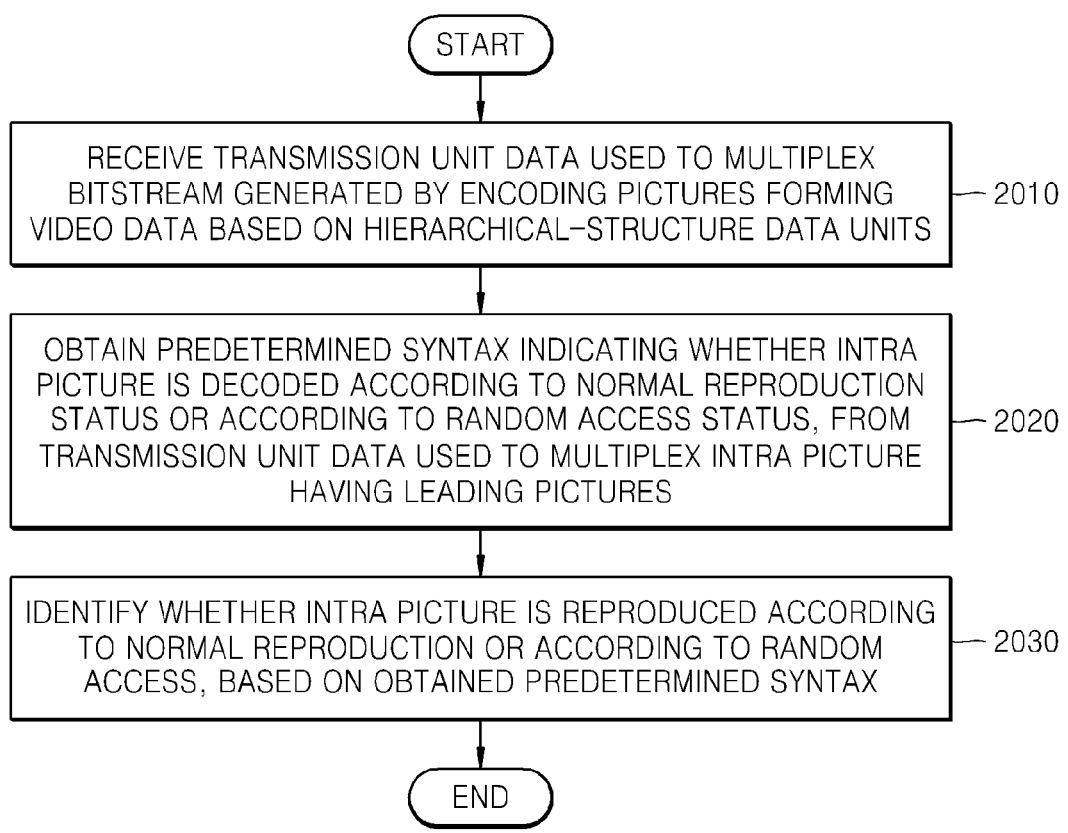
FIG. 20 is a flowchart of a method of inverse-multiplexing video data, according to an exemplary embodiment.

FIG. 20 is a flowchart of a method of inverse-multiplexing video data, according to an exemplary embodiment.

Referring to FIG. 20, in operation 2010, the inverse-multiplexer 1920 receives transmission unit data used to multiplex a bitstream generated by encoding pictures forming the video data based on hierarchical-structure data units. As described above, the transmission unit data may be NAL unit data.

In operation 2020, the inverse-multiplexer 1920 obtains syntax indicating whether a CRA picture is decoded according to a normal reproduction status or according to a random access status, from NAL unit data that is used to multiplex the CRA picture.

In operation 2030, the reproduction status identifier 1930 identifies whether the CRA picture is reproduced according to normal reproduction or according to a random access, based on the obtained syntax. As described above, when a header of an NAL unit signals a decoding status of the CRA picture by using an identifier (nal unit type), the reproduction status identifier 1930 may recognize a decoding status of a current CRA picture by referring to a value of the identifier (nal unit type). If a flag having a value of 0 or 1 is added to the header of the NAL unit, the reproduction status identifier 1930 may recognize the decoding status of the current CRA picture by referring to information of the flag. Also, when a PDC and POC information of a brother picture are included in the header of the NAL unit, the reproduction status identifier 1930 may recognize the decoding status of the current CRA picture by determining a match between a PDC obtained in a decoding process, and the PDC included in the header of the NAL unit, and a match between a POC value of previous pictures stored in a DPB, and a POC value of the brother picture.

When it is determined that the CRA picture is reproduced according to the random access, leading pictures of the CRA picture are not displayed and thus are not required to be decoded. According to one or more exemplary embodiments, the CRA picture that is reproduced according to the random access may be identified, so that the leading pictures of the CRA picture may not be decoded and thus a system resource of the decoding apparatus may be saved.

One or more exemplary embodiments may also be computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

While exemplary embodiments have been described, it will be understood by those of ordinary skill in the art that various changes in form and details may be made therein without departing from the spirit and scope of the invention as defined by the appended claims. Therefore, the scope of the invention is defined not by the detailed description but by the appended claims, and all differences within the scope will be construed as being included in the present invention.

The invention claimed is:

1. A method for decoding a video, the method comprising:
receiving transmission unit data containing a header;
obtaining, from the header, type information that indicates a type of a current picture contained in the transmission unit data;
identifying whether the current picture is a CRA (Clean Random Access) picture for a random access based on the type information;
determining whether the identified CRA picture is decoded according to normal reproduction or according to a random access, based on a flag of the identified CRA picture; and
decoding the video including the identified CRA picture,
wherein the video includes a leading picture of the current picture that follows the current picture in a decoding order and precedes the current picture in a display order.

2. The method of claim 1,
wherein the identified CRA picture is split into a plurality of maximum coding units,
wherein one of the plurality of maximum coding units is split into a plurality of coding units by using split information parsed from a bitstream, and
wherein the identified CRA picture is decoded based on the plurality of coding units.

3. The method of claim 1,
wherein the transmission unit data is NAL (Network Abstraction Layer) unit data that is transmission unit data in a Network Abstraction Layer, and
wherein the type information is NAL unit type information that indicates the type of the current picture contained in the transmission unit data.

* * * * *